Patented Dec. 28, 1926.

1,612,102

UNITED STATES PATENT OFFICE.

LOUIS CHARLES DREFAHL, OF LAKEWOOD, OHIO, ASSIGNOR TO THE GRASSELLI CHEMICAL COMPANY, OF CLEVELAND, OHIO, A CORPORATION OF OHIO.

WOOD PRESERVATION.

No Drawing.    Application filed April 15, 1925. Serial No. 23,431.

This invention relates to the preservation of wood by the impregnation thereof with phenarsazine chloride and an oily preservative agent.

Phenarsazine chloride which may be prepared, for instance, by heating a mixture of diphenylamine, arsenious oxid and hydrochloric acid, has valuable insecticidal and fungicidal properties, and I have conceived the idea of using it for the preservation of wood, and particularly for the preservation of wood exposed to sea water. In the course of investigations designed to determine the wood-preserving properties of phenarsazine chloride with respect to wood exposed to sea water, it has been found that it exerts a satisfactory preservative action against the attachment of marine growth and the attack of organisms such as the Teredo and Limnoria, but that the preserving action is not lasting, due apparently to the fact that the preserving agent is in time leached out of the wood. In the further development of the invention it has been found that the phenarsazine chloride is sufficiently soluble in oil that wood impregnated with the oil solution will contain a preservative quantity of the phenarsazine chloride, and further that the oil prevents or retards the leaching out of the phenarsazine chloride. For the preservation of wood for general use, such as railroad cross ties, piling and the like, oils or products derived from petroleum and coal distillation may be used as the solvent and vehicle for the phenarsazine chloride, but for the preservation of wood in contact with sea water I prefer to use paraffin or other normally solid oily material. Paraffin dissolves phenarsazine to a sufficient extent, in excess of 5%, so that wood impregnated with the paraffin solution contains a preservative amount of the phenarsazine chloride. Paraffin has the additional advantage with respect to the preservation of wood against the action of sea water that it is a solid at normal sea water temperatures, and consequently does not bleed and is not leached or washed out of the wood, and of course also retains the phenarsazine chloride. The preferred form of my invention therefore is the impregnation of wood which is to be subjected to the action of sea water with a paraffin solution of phenarsazine chloride.

The impregnation of the wood may be accomplished in any suitable way, for example, a 5% solution of phenarsazine chloride in paraffin is prepared by mixing 5 parts of the phenarsazine chloride with 100 parts of hot melted paraffin and wood is impregnated with the resulting solution by any of the known methods applicable for the impregnation of wood with oily materials, for instance, the wood is dried and placed in an autoclave heated to say 75° C. and evacuated, the paraffin solution is introduced and the pressure in the autoclave is increased to say 125 pounds per square inch and held for about an hour, and the pressure is then released and the wood removed from the autoclave.

Comparative tests on untreated wood, creosoted wood, and wood impregnated with a paraffin solution of phenarsazine chloride subjected to the action of sea water show a very good and lasting preservation of the wood impregnated with the paraffin solution of phenarsazine chloride against the attachment of marine growths and the attack of organisms such as the Teredo and the Limnoria. It is of course within the scope of my invention to vary the concentration of the paraffin solution of phenarsazine chloride and to use oily materials other than paraffin as the solvent and vehicle for the phenarsazine chloride, and also of course to use the phenarsazine chloride in conjunction with other preservatives either dissolved in the oily vehicle or emulsified therewith or separately applied.

As equivalents of or substitutes for the phenarsazine chloride there may be used other analogous toxic organic arsenic compounds, such as phenarsazine oxide, diphenyl chloroarsine, and nitrosodimethylanilinechloroarsine.

I claim:—

1. Process of preserving wood which comprises impregnating the wood with a solution of phenarsazine chloride in an oil.

2. Process of preserving wood which comprises impregnating the wood with a solution of phenarsazine chloride in paraffin.

3. Process of preserving wood which comprises impregnating the wood with a 5% solution of phenarsazine chloride in paraffin.

4. Process of preserving wood which comprises impregnating the wood with a solution of a toxic organic arsenic compound in paraffin.

5. As a new product, wood impregnated with a solution of phenarsazine chloride in an oil.

6. As a new product, wood impregnated with a solution of phenarsazine chloride in paraffin.

7. As a new product, wood impregnated with a solution of a toxic organic arsenic compound in paraffin.

In testimony whereof, I affix my signature.

LOUIS CHARLES DREFAHL.